(12) United States Patent
Shaffer et al.

(10) Patent No.: US 8,284,920 B2
(45) Date of Patent: Oct. 9, 2012

(54) METHOD AND SYSTEM FOR TRANSFERRING A CALL AT AN AUTOMATIC CALL DISTRIBUTION SYSTEM

(75) Inventors: Shmuel Shaffer, Palo Alto, CA (US); Gebran G. Chahrouri, Menlo Park, CA (US); Labhesh Patel, Mountain View, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1618 days.

(21) Appl. No.: 11/076,896

(22) Filed: Mar. 10, 2005

(65) Prior Publication Data

US 2006/0203994 A1    Sep. 14, 2006

(51) Int. Cl.
*H04M 3/42* (2006.01)
*H04M 3/00* (2006.01)

(52) U.S. Cl. ............... 379/212.01; 379/265.01

(58) Field of Classification Search ............. 379/212.01, 379/265.01–265.02, 211.02, 265.12
See application file for complete search history.

(56) References Cited

U.S. PATENT DOCUMENTS

| | | | | |
|---|---|---|---|---|
| 4,484,031 | A | 11/1984 | Gray et al. | 179/18 BE |
| 5,469,491 | A * | 11/1995 | Morley et al. | 379/88.13 |
| 5,751,698 | A | 5/1998 | Cushman et al. | 370/252 |
| 5,870,457 | A | 2/1999 | Mumford | 379/93.09 |
| 5,915,010 | A | 6/1999 | McCalmont | 379/212 |
| 5,953,332 | A * | 9/1999 | Miloslavsky | 370/352 |
| 6,553,112 | B2 | 4/2003 | Ishikawa | 379/265.02 |
| 6,650,748 | B1 | 11/2003 | Edwards et al. | 379/266.04 |
| 7,103,166 | B2 * | 9/2006 | Crockett et al. | 379/211.02 |
| 2003/0194075 | A1 * | 10/2003 | McGrath et al. | 379/218.01 |
| 2006/0182252 | A1 * | 8/2006 | Harris et al. | 379/211.01 |

* cited by examiner

*Primary Examiner* — Rasha Al Aubaidi
(74) *Attorney, Agent, or Firm* — Baker Botts L.L.P.

(57) ABSTRACT

A method for transferring a call at an automatic call distribution system includes receiving from a caller a call for connection with one of a plurality of agents and connecting the call to a selected first agent of the plurality of agents. The method includes, while maintaining communication between the first agent and the caller, receiving a request to transfer the call to another one of the plurality of agents and selecting a second agent of the plurality of agents to receive the call transfer. The method also includes notifying the first agent of the selection of the second agent to receive the call transfer and transferring the call to the second agent.

17 Claims, 2 Drawing Sheets

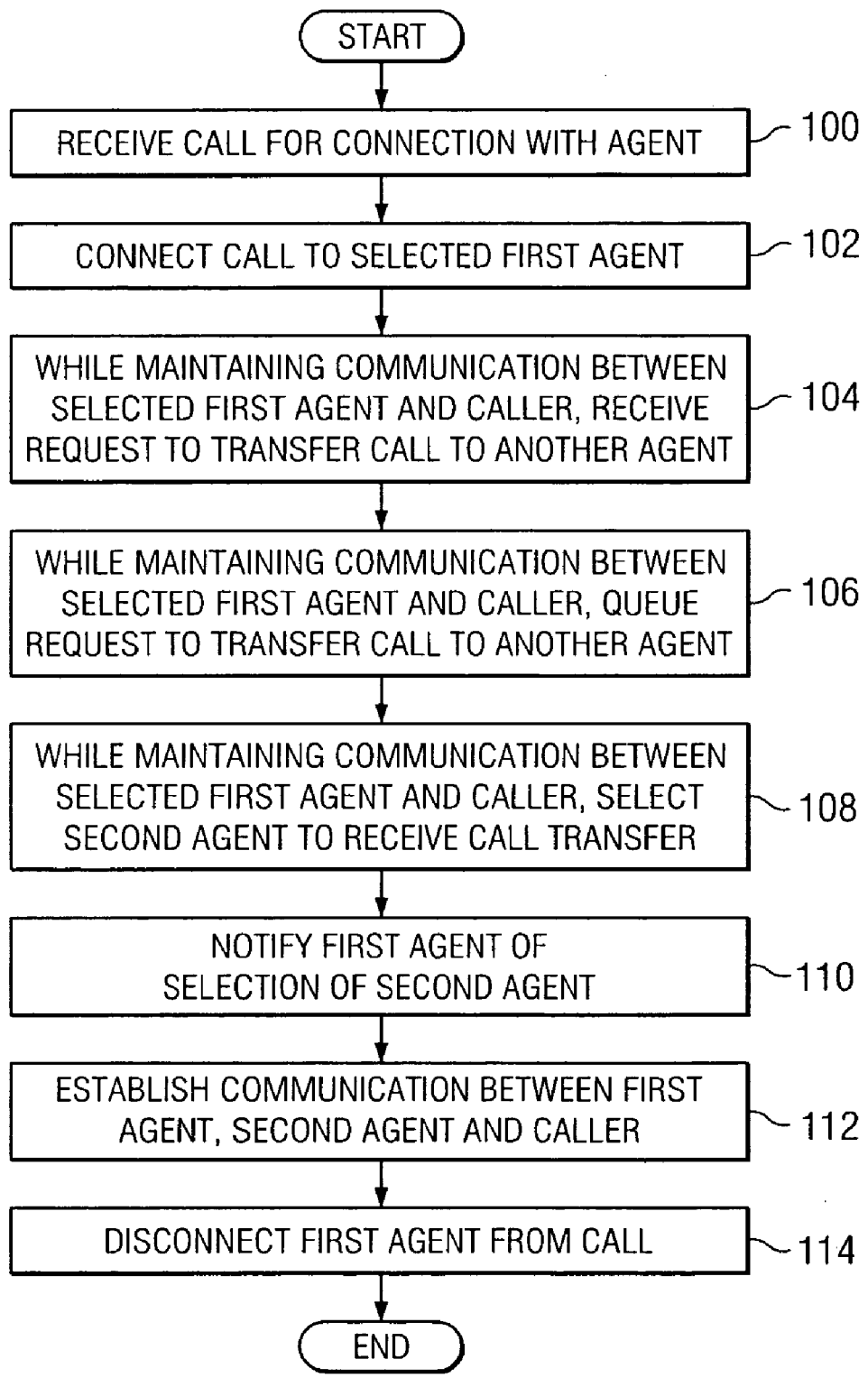

METHOD AND SYSTEM FOR TRANSFERRING A CALL AT AN AUTOMATIC CALL DISTRIBUTION SYSTEM

TECHNICAL FIELD OF THE INVENTION

This invention relates in general to communication systems and, more particularly, to a method and system for transferring a call at an automatic call distribution system.

BACKGROUND OF THE INVENTION

Automatic call distributors (ACDS) and other contact or call centers typically include specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

In some instances, customers calling a call center may need to be connected to more than one agent to complete their business. This may occur, for example, when the transaction requires multiple skills or when the first agent does not have the required skills and the transaction is best handled by another agent. For example, when a customer wants to install a new phone line with DSL service he may first speak with a "voice" agent and initiate the installation of the phone service. When the "voice" transaction is completed the first agent may need to involve a "data" agent to add the DSL/data service on the newly created phone line. The hand-off between the two agents is typically done by invoking either a normal transfer or a warm transfer (via conference) feature.

A normal transfer may involve a "voice" agent asking the customer to hold and pressing the transfer button on the phone of the "voice" agent which places the customer on hold. The "voice" agent then dials the ACD number for the DSL/data service and typically is placed in queue for the first available "data" agent. Upon being connected to the "data" agent, the "voice" agent informs the "data" agent of the nature of the call he is about to transfer. The "voice" agent then completes the transfer by pressing the transfer button again. This un-holds the customer and connect him to the "data" agent. Upon completion of the transfer, the "voice" agent frees up. The "data" agent handles the customer and completes the transaction.

A warm transfer may involve the "voice" agent asking the customer to hold and pressing the conference button on the phone of the "voice" agent which places the customer on hold. The "voice" agent then dials the ACD number for the DSL/data service and typically is placed in queue for the first available "data" agent. Upon being connected to the "data" agent, the "voice" agent informs the "data" agent of the nature of the call he is about to transfer. The "voice" agent then completes the warm transfer by pressing the conference button again. This un-holds the customer and connects the customer into a conference with the two agents. The "voice" agent introduces the caller and the agent to each other and completes the transfer by hanging up. Upon completion of the transfer, the "voice" agent frees up. The "data" agent handles the customer and completes the transaction.

In both of the scenarios described above, the caller is placed on hold to wait to be transferred to the second agent. At the same time, the first agent is on hold as well while waiting in a queue for the second agent.

SUMMARY OF THE INVENTION

The present invention provides a method and system for transferring a call at an automatic call distribution system that substantially eliminates or reduces at least some of the disadvantages and problems associated with previous methods and systems.

In accordance with a particular embodiment of the present invention, a method for transferring a call at an automatic call distribution system includes receiving from a caller a call for connection with one of a plurality of agents and connecting the call to a selected first agent of the plurality of agents. The method includes, while maintaining communication between the first agent and the caller, receiving a request to transfer the call to another one of the plurality of agents and selecting a second agent of the plurality of agents to receive the call transfer. The method also includes notifying the first agent of the selection of the second agent to receive the call transfer and transferring the call to the second agent.

The method may also include, while maintaining communication between the first agent and the caller, queuing the request to transfer the call prior to selecting a second agent to receive the call transfer. Queuing the request to transfer the call may comprise placing the request to transfer the call into a queue comprising additional calls for initially connecting with one of a plurality of agents. The method may also include prioritizing the request to transfer the call over the additional calls in the queue. The request to transfer the call to another one of the plurality of agents may comprise information about the caller or information indicating a reason for the transfer request. Transferring the call to the second agent may comprise conferencing the second agent such that communication is established between the caller, the first agent and the second agent.

In accordance with another embodiment, a system for transferring a call at an automatic call distribution system includes an interface operable to receive from a caller a call for connection with one of a plurality of agents. The system includes a processor coupled to the interface and operable to connect the call to a selected first agent of the plurality of agents and, while maintaining communication between the first agent and the caller, receive a request to transfer the call to another one of the plurality of agents and select a second agent of the plurality of agents to receive the call transfer. The processor is also operable to notify the first agent of the selection of the second agent to receive the call transfer and transfer the call to the second agent.

Technical advantages of particular embodiments of the present invention include methods and systems for transferring a call at an automatic call distributor that allow an agent and a caller to continue their interaction while they wait for a second agent to whom the call will be transferred to be selected. This improves customer satisfaction by reducing wait time for customers without a live agent. The requirement for music on hold (MOH) resources may be reduced since the time the caller is waiting without a live agent is reduced. Efficiency of call centers is also improved since the first agent may attempt to progress or complete a transaction with a customer while the request for transfer to a second agent is in queue.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates a method for transferring a call at an automatic call distribution system, in accordance with an embodiment of the present invention.

DETAILED DESCRIPTION OF THE INVENTION

Figure 1:
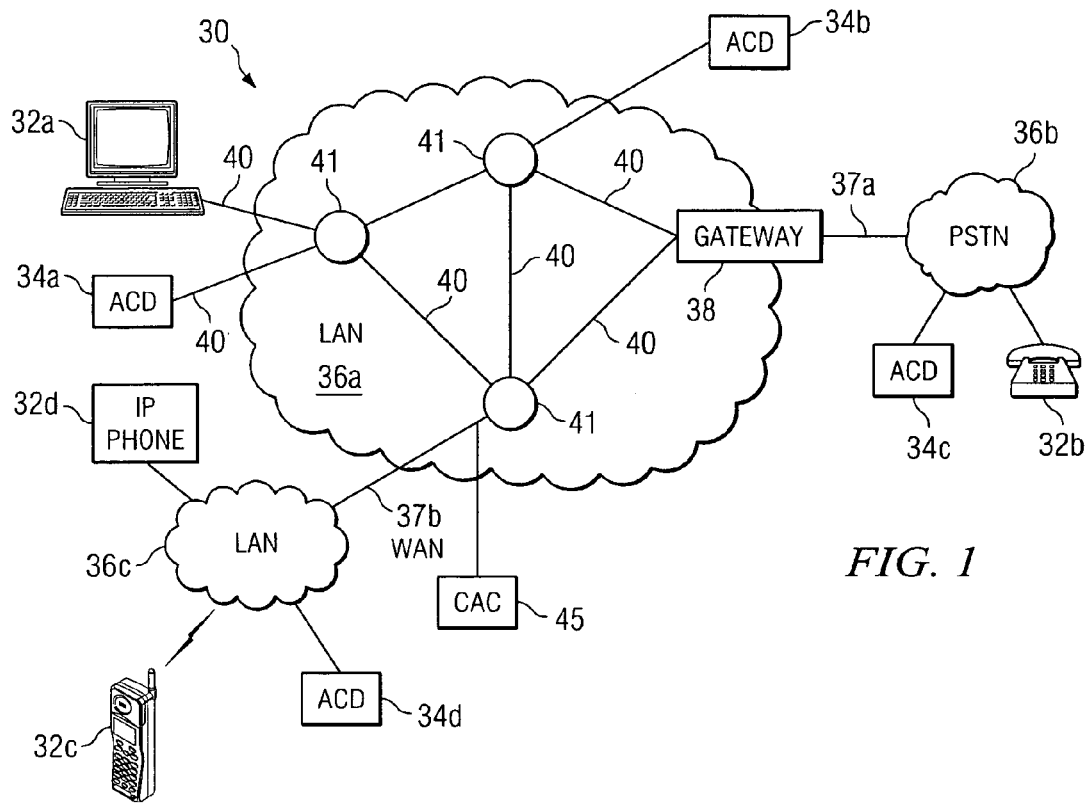
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls. "Calls" shall include requests for service transmitted using any audio and/or video means, including signals, data or messages transmitted through voice devices, text chat, web sessions, facsimile, instant messaging and e-mail. ACDs may include outsourced call centers or other contact centers that receive incoming customer calls for distribution to agents and that place calls from agents to customers.

In particular embodiments, customers calling an ACD may be connected to an agent. The nature of the call may require a transfer to a different agent than the agent with whom the customer is communicating. Particular embodiments allow an agent and a caller to continue their interaction while they wait for a second agent to whom the call will be transferred to be selected. This improves customer satisfaction by reducing wait time for customers without a live agent. The requirement for music on hold (MOH) resources may be reduced since the time the caller is waiting without a live agent is reduced. Efficiency of call centers is also improved since the first agent may attempt to progress or complete a transaction with a customer while the request for transfer to a second agent is in queue.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with ACDs 34a and 34b, gateway 38, and communication networks 36b-36c. Therefore, a user of endpoint 32a is provided with access to endpoints 32b-32d, and automatic call distributors 34a-34d. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
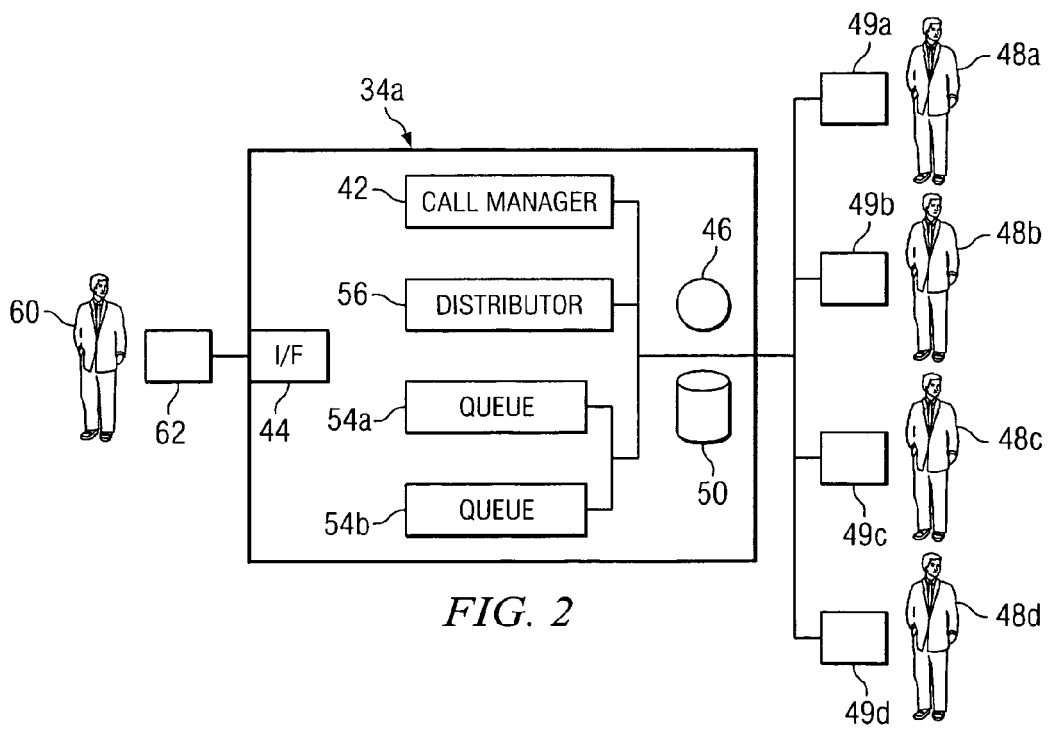
FIG. 2 illustrates an automatic call distributor of FIG. 1 in more detail, illustrating aspects of the present invention.

FIG. 2 illustrates ACD 34a in more detail, in accordance with a particular embodiment of the present invention. In the illustrated embodiment, ACD 34a includes a call manager 42, an interface or input ports 44, a processor 46, memory module 50, queues 54 and a distributor 56. Interface or input ports 44 couple ACD 34a with communication network 36a. Processor 46 may be a microprocessor, controller, or any other suitable computing device, resource, or combination of hardware, software and/or encoded logic. Memory module 50 may be any form of volatile or non-volatile memory including, without limitation, magnetic media, optical media, random access memory (RAM), read-only memory (ROM), removable media, or any other suitable local or remote memory component.

The illustrated embodiment includes agents 48 associated with ACD 34a. It should be understood that ACDs in accordance with various embodiments may be associated with any suitable number of agents 48. The illustrated embodiment also includes caller 60. Agents 48 use respective endpoints 49 to communicate with callers to ACD 34a, and caller 60 uses endpoint 62 to communicate with agents 48 associated with ACD 34a. Endpoints 49 and 62 may be similar to one or more of the endpoints described above with respect to FIG. 1, such as IP phone endpoint 32d. It should be understood that endpoints 49 and 62 may be coupled to ACD 34a through one or more communication networks, such as the communication networks described above with respect to FIG. 1 which may include one or more WANs or LANs as indicated above.

Call manager 42 maintains information on all agents and other users of system 30 and facilitates communication among users. Call manager 42 may be any combination of hardware, software, and/or encoded logic and is used by ACD 34a to manage agents 48 and other users of system 30. In particular embodiments, call manager 42 may maintain a listing, table, or other organization of information about agents 48 and other users of system 30. The information may include a name or other identifier for each agent 48 and other user. The information may also include contact information such as phone numbers and email addresses for the agents 48 and users. For identifying agents 48a-48d that may be contacted or otherwise recruited to handle incoming calls received by the ACD 34a, call manager 42 may also include information identifying whether a user of system 30 is a call agent or performs other tasks within the organization. As is the case with other components of ACD 34a, in particular embodiments the functionality of call manager 42 may be performed by hardware, software or encoded logic distributed throughout a communication network coupled with the ACD.

When an incoming call is received by processor 46, processor 46 determines if a suitable agent 48 is available to receive an incoming call. If a suitable agent is available to receive the incoming call, distributor 56 distributes the call to such agent for handling. For example, distributor 56 may connect a voice or video call with the available suitable agent. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or to ACD 34a. While a customer is waiting for an agent, ACD 34a may perform one or more of several functions including data collection from the user, playing of pre-recorded messages, or other automated process. As soon as a suitable agent becomes available, distributor 56 distributes the call to the appropriate agent.

As discussed above, particular embodiments allow an agent and a caller to continue their interaction while they wait for a second agent to whom the call will be transferred to be selected. As an example in operation, a customer or caller 60 may call ACD 34a using endpoint 62. Caller 60 is eventually connected to an agent, such as agent 48a. As indicated above, the caller's call may have to wait in a queue 54 before connection with agent 48a. At some point during the call, it may be determined that caller 60 needs to communicated with another agent. At this time, agent 48a may invoke an enhanced warm transfer, for example, by pressing a button on his endpoint 49a. This sends a signal to ACD 34a that requests that another agent be identified for connection with caller 60. Any special skills required of the second agent for servicing the caller may be included in the request. Any suitable signaling protocols may be used to request the second agent. In particular embodiments, the request for the second agent may comprise a "GetAgent" request.

ACD 34a may authenticate the requester (in this case agent 48a) and attach any ACD information to the request for the second agent. Such ACD information may include, for example, information related to the customer (e.g., priority information, account history, etc.) or to the call (e.g., initial reason for the call or reason for the transfer request). ACD 34a, through processor 46, acknowledges the request and invokes a search for such an agent. For example, processor 46 may search for an available suitable agent desired in the transfer request. If no suitable agent is available, ACD 34a may place the request in a queue 54. In some embodiments, a request for another agent to handle a transfer may have a higher priority in the queue than other requests, such as normal calls to the ACD for initially connected with an agent. In particular embodiments, higher priority in a queue may be based on an identity of the caller, a reason for the initial call or for the transfer or an identity of the agent 48a requesting another agent for a transfer.

In particular embodiments, since ACD 34a does not create a new call connection between the agent 48a and the ACD queue to request the second agent for the transfer, ACD 34a is able to maintain the call connection between caller 60 and agent 48a. This allows the caller and the agent to continue their interaction while they wait for the second agent. Thus, caller 60 and the agent 48a may engage while in queue. At any point in time (for example while agent 48a is waiting for the second agent), a request may be transmitted to cancel the request for a second agent for the transfer. This cancellation request may remove the request for the second agent from the ACD queue and may be transmitted by, for example, agent 48a using endpoint 49a. In particular embodiments, this cancellation request may comprise a "CancelGetAgent" request.

When an agent with the requested skill set for the transfer becomes available, processor 46 may ring this agent and may provide him with the available information about the session, for example, in the form of a "screen pop," instant message (IM), e-mail or other communication to, for example, an endpoint associated with the agent. For purposes of this example, assume that agent 48b is the second agent who is suitable and available to receive the transfer. In one embodiment, when agent 48b answers the call, processor 46 plays a voice prompt informing the second agent that he is about to receive a warm transfer. To perform the transfer/conference ACD 34a may transmit an indication to agent 48a that a suitable and available agent has been found to take the transfer. In particular embodiments, this indication may comprise an "AgentFound" indication transmitted to endpoint 49a via any suitable signaling protocol.

Agent 48a informs caller 60 that a suitable agent, agent 48b, is available to take the transfer, and agent 48a completes the next phase of the transfer. In some embodiments, this may include pressing a button on endpoint 49a. As a result, endpoint 49a transmits a message to ACD 34a directing the ACD to connect agent 48a with agent 48b. In particular embodiments, this may comprise a "ConnectAgent" message. Agent 48a may thus communicate with agent 48b about the caller and/or transfer request before agent 48b is connected with caller 60. After agent 48a concludes his discussion with agent 48b, agent 48a may either complete the transfer by connecting caller 60 directly with agent 48b (by, for example, indicating a transfer command through endpoint 49a) or conference caller 60 into the discussion between agent 48a and agent 48b (again, by, for example, indicating a conference command through endpoint 49a). In particular embodiments, the conference of multiple endpoints through the ACD may be accomplished by a conference bridge of the ACD. If agent 48a conferences in caller 60 such that caller 60, agent 48a and agent 48b are communicating, at some subsequent point agent 48a may disconnect from the conference to allow agent 48b to complete the call. After completing the transfer/conference with caller 60 and agent 48b, agent 48a may then be freed up to accept additional calls while agent 48b handles the call from caller 60.

It should be understood that in some situations, agent 48a may not communicate directly with agent 48b prior to the transfer or conference. For example, once agent 48a is informed that agent 48b is a suitable and available agent for the transfer, agent 48a may immediately transfer caller 60 to agent 48b without first communicating with agent 48b while caller 60 is on hold. As another example, when agent 48a is informed that agent 48b is a suitable and available agent for the transfer, agent 48a may immediately conference in agent 48b such that caller 60, agent 48a and agent 48b may communicate without agent 48a first communicating alone with agent 48b while caller 60 is on hold.

It will be recognized by those of ordinary skill in the art that ACD 34a is merely one example configuration of an ACD for transferring a call, in accordance with an embodiment of the present invention. ACD 34a may include any number of interfaces, call managers, processors, memory modules, distributors and queues to accomplish the functionality and features described herein. For example, although ACD 34a is illustrated and described as including call manager 42, interface 44, processor 46, memory module 50, two queues 54 and distributor 56, these components and other desired components for performing the above described functionality may be centrally located (local) with respect to one another, or distributed throughout communication system 30.

FIG. 3 is a flowchart illustrating a method for transferring a call at an automatic call distribution system, in accordance with an embodiment of the present invention. The method begins at step 100 where a call is received from a caller for connection with an agent. In particular circumstances, the call may be placed in a queue while waiting on a suitable agent to become available to answer the call. At step 102, the call is connected to a selected first agent.

While the first agent is handling the call, it is determined that the caller needs to speak with another agent. For example, the caller may request some type of service that an agent other than the first agent (with whom the caller is communicating) can better provide. Upon determining that the call should be transferred to another agent, a request is received at step 104 to transfer the call to another agent. The request may be transmitted by the first agent (for example, by the first agent indicating the transfer request through his associated endpoint). The request may include various information, such as information about the caller or information about the reason for the transfer. At step 106, while maintaining communication between the first agent and the caller, the request to transfer the call to another agent is queued. In some embodiments, such queued transfer request may take priority over other queued requests based on, for example, an identity of the caller, an identity of the first agent, a reason for the transfer or the mere fact that the request is a transfer request. In some cases, the transfer request may not need to be queued to await an agent to whom the call will be transferred.

At step 108, while maintaining communication between the first agent and the caller, a second agent is selected to received the call transfer. The second agent may be selected based on availability and/or particular skills required to handle the transfer. In some embodiments, after the selection of the second agent to receive the call transfer, the second agent may be conferenced in a listen only mode with the caller and the first agent. At step 110, the first agent is notified that the second agent has been selected to handle the transfer. Such notification may take place while the first agent is communicating with the caller (for example, through a message at the first agent's endpoint such as an e-mail, an instant message or a whisper notification). The first agent then transfers the call to the selected second agent. In some cases, the caller may be placed on hold while awaiting connection with the selected second agent.

In particular cases, the transfer may include step 112 of establishing communication between the first agent, the second agent and the caller through, for example, a conference or bridging feature. At step 114, the first agent is disconnected, and the second agent is able to handle the transferred call. In some embodiments, the first agent may not conference with the caller and the second agent upon notification that a second agent has been selected. In such cases, the first agent may simply transfer the call to the second agent upon receiving such notification.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include methods and systems for transferring a call at an automatic call distributor that allow an agent and a caller to continue their interaction while they wait for a second agent to whom the call will be transferred to be selected. This improves customer satisfaction by reducing wait time for customers without a live agent. The requirement for music on hold (MOH) resources may be reduced since the time the caller is waiting without a live agent is reduced. Efficiency of call centers is also improved since the first agent may attempt to progress or complete a transaction with a customer while the request for transfer to a second agent is in queue.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and ACD 34*a*, these elements may be combined, rearranged or positioned in order to accommodate particular routing architectures or needs. In addition, any of these elements may be provided as separate external components to communication system 30, ACD 34*a* or each other where appropriate. The present invention contemplates great flexibility in the arrangement of these elements as well as their internal components.

As another example, the present invention has been described with reference to outsourced ACD call centers. It is recognized, however, that the architecture and functionality described above is applicable generally to all call or contact centers that operate to answer incoming calls and identify appropriate agents to receive the calls. Accordingly, the described ACDs may include those call or contact centers that are located within an enterprise and are staffed by enterprise employees. ACDs are not intended to be limited to hosted and outsourced call or contact centers.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for transferring a call at an automatic call distribution system, comprising:
receiving from a caller a call for connection with one of a plurality of agents;
connecting the call to a selected first agent of the plurality of agents;
while maintaining communication between the first agent and the caller:
receiving a request to transfer the call to another one of the plurality of agents;
queuing the request to transfer the call, wherein queuing the request to transfer the call comprises placing the request to transfer the call into a queue comprising additional calls for initially connecting with one of a plurality of agents;
prioritizing the request to transfer the call over the additional calls in the queue; and
selecting a second agent of the plurality of agents to receive the call transfer;
notifying the first agent of the selection of the second agent to receive the call transfer, wherein notifying the first agent of the selection of the second agent to receive the call transfer comprises notifying the first agent of the identity of the second agent selected to receive the call transfer; and
transferring the call to the second agent, wherein transferring the call to the second agent comprises conferencing the second agent such that an active communication session is established between the caller, the first agent, and the second agent, whereby the caller, first agent, and second agent are communicating with each other in the active communication session.

2. The method of claim 1, wherein prioritizing the request to transfer the call over the additional calls in the queue comprises prioritizing the request to transfer the call according to an identity of the caller.

3. The method of claim 2, wherein the identity of the caller comprises identification information irrespective of the status of the call.

4. The method of claim 1, wherein notifying the first agent of the selection of the second agent to receive the call transfer comprises notifying the first agent of the selection of the second agent to receive the call transfer through a whisper notification.

5. The method of claim 1, further comprising, after notifying the first agent of the selection of the second agent, placing the caller on hold to transfer the call to the second agent.

6. The method of claim 1, wherein the request to transfer the call to another one of the plurality of agents comprises information about the caller.

7. The method of claim 1, wherein the request to transfer the call to another one of the plurality of agents comprises information indicating a reason for the transfer request.

8. The method of claim 1, further comprising, after selecting the second agent to receive the call transfer, conferencing the second agent in a listen only mode with the caller and the first agent.

9. A system for transferring a call at an automatic call distribution system, comprising:
an interface operable to receive from a caller a call for connection with one of a plurality of agents;
a processor coupled to the interface and operable to:
connect the call to a selected first agent of the plurality of agents;
while maintaining communication between the first agent and the caller:
receive a request to transfer the call to another one of the plurality of agents;

queue the request to transfer the call, wherein a processor operable to queue the request to transfer the call comprises a processor operable to place the request to transfer the call into a queue comprising additional calls for initially connecting with one of a plurality of agents;

prioritize the request to transfer the call over the additional calls in the queue; and select a second agent of the plurality of agents to receive the call transfer;

notify the first agent of the selection of the second agent to receive the call transfer, wherein a processor operable to notify the first agent of the selection of the second agent to receive the call transfer comprises a processor operable to notify the first agent of the identity of the second agent selected to receive the call transfer; and transfer the call to the second agent, wherein a processor operable to transfer the call to the second agent is operable to conference the second agent such that an active communication session is established between the caller, the first agent, and the second agent, whereby the caller, first agent, and second agent are communicating with each other in the active communication session.

10. The system of claim 9, wherein a processor operable to prioritize the request to transfer the call over the additional calls in the queue comprises a processor operable to prioritize the request to transfer the call according to an identity of the caller.

11. The system of claim 9, wherein a processor operable to notify the first agent of the selection of the second agent to receive the call transfer comprises a processor operable to notify the first agent of the selection of the second agent to receive the call transfer through a whisper notification.

12. The system of claim 9, wherein the processor is further operable to, after notifying the first agent of the selection of the second agent, place the caller on hold to transfer the call to the second agent.

13. The system of claim 9, wherein the request to transfer the call to another one of the plurality of agents comprises information about the caller.

14. The system of claim 9, wherein the request to transfer the call to another one of the plurality of agents comprises information indicating a reason for the transfer request.

15. The system of claim 9, wherein the processor is further operable to, after selecting the second agent to receive the call transfer, conference the second agent in a listen only mode with the caller and the first agent.

16. A system for transferring a call at an automatic call distribution system, comprising:

means for receiving from a caller a call for connection with one of a plurality of agents;

means for connecting the call to a selected first agent of the plurality of agents;

means for, while maintaining communication between the first agent and the caller:

receiving a request to transfer the call to another one of the plurality of agents;

queuing the request to transfer the call, wherein means for queuing the request to transfer the call comprises means for placing the request to transfer the call into a queue comprising additional calls for initially connecting with one of a plurality of agents;

prioritizing the request to transfer the call over the additional calls in the queue; and selecting a second agent of the plurality of agents to receive the call transfer;

means for notifying the first agent of the selection of the second agent to receive the call transfer, wherein means for notifying the first agent of the selection of the second agent to receive the call transfer comprises means for notifying the first agent of the identity of the second agent selected to receive the call transfer; and means for transferring the call to the second agent comprising conferencing the second agent such that an active communication session is established between the caller, the first agent, and the second agent, whereby the caller, first agent, and second agent are communicating with each other in the active communication session.

17. Logic embodied in a non-transitory, tangible a computer readable medium, the computer readable medium comprising code operable to:

receive from a caller a call for connection with one of a plurality of agents;

connect the call to a selected first agent of the plurality of agents;

while maintaining communication between the first agent and the caller:

receive a request to transfer the call to another one of the plurality of agents;

queue the request to transfer the call, wherein code operable to queue the request to transfer the call comprises code operable to place the request to transfer the call into a queue comprising additional calls for initially connecting with one of a plurality of agents;

prioritize the request to transfer the call over the additional calls in the queue; and select a second agent of the plurality of agents to receive the call transfer;

notify the first agent of the selection of the second agent to receive the call transfer, wherein code operable to notify the first agent of the selection of the second agent to receive the call transfer comprises code operable to notify the first agent of the identity of the second agent selected to receive the call transfer; and transfer the call to the second agent, wherein code operable to transfer the call to the second agent is operable to conference the second agent such that an active communication session is established between the caller, the first agent, and the second agent, whereby the caller, first agent, and second agent are communicating with each other in the active communication session.

* * * * *